United States Patent [19]

Mitsumoto et al.

[11] 4,335,747
[45] Jun. 22, 1982

[54] CONNECTING DEVICE FOR CONDUITS

[75] Inventors: Takashi Mitsumoto, Toyota; Hiroshi Nakashima, Musashino, both of Japan

[73] Assignees: Aisin Seiki Kabushiki Kaisha, Kariya; Japanese National Railways, Tokyo, both of Japan

[21] Appl. No.: 199,340

[22] Filed: Oct. 21, 1980

[30] Foreign Application Priority Data

Oct. 26, 1979 [JP] Japan .................. 54/138865

[51] Int. Cl.³ ............................. F16L 37/28
[52] U.S. Cl. ..................... 137/614.06; 137/614; 251/142; 251/149.9
[58] Field of Search ............. 137/614.01, 614, 614.06, 137/614.03, 614.04; 251/142, 142.2, 149.9

[56] References Cited

U.S. PATENT DOCUMENTS

| | | | |
|---|---|---|---|
| 1,800,045 | 4/1931 | Bates | 251/149.2 |
| 2,440,946 | 5/1948 | Hansen | 137/614.06 |
| 3,159,180 | 12/1964 | Courtot et al. | 137/614.06 |
| 3,276,474 | 8/1966 | Gill | 137/614.03 |
| 3,279,497 | 10/1966 | Norton et al. | 137/614.03 |
| 3,382,892 | 5/1968 | Cerbin | 137/614.02 |
| 3,537,477 | 11/1970 | Mahoff | 251/149.2 |
| 3,545,490 | 12/1970 | Burrus | 137/614.06 |
| 3,606,244 | 9/1971 | Nusbaum | 251/149.9 |
| 3,618,892 | 11/1971 | Sciuto | 251/149.2 |
| 3,921,656 | 11/1975 | Meisenheimer et al. | 137/68 |
| 4,181,149 | 1/1980 | Cox | 137/614.02 |
| 4,256,106 | 3/1981 | Shoor | 251/149.1 |

FOREIGN PATENT DOCUMENTS 2447357 4/1976 Fed. Rep. of Germany ...... 137/614

Primary Examiner—A. Michael Chambers
Attorney, Agent, or Firm—Finnegan, Henderson, Farabow

[57] ABSTRACT

A connecting device for conduits comprising a female connecting element having an axial bore opening at one end, and a male connecting element adapted to be inserted into the axial bore of the female connecting element. A first ball valve assembly has a housing adapted to be mounted at one end on the female connecting element and formed at the other end with a flat mating surface. In the housing, there is a spherical valve element having a diametrically extending through-hole. The mating surface of the housing is formed with an opening through which a part of the valve element projects. On the male connecting element, there is mounted a second ball valve assembly which is similar in structure to the first ball valve assembly except that the spherical valve element does not project beyond the mating surface but is formed with a part-spherical recess for receiving the projected portion of the valve element in the first ball valve assembly. The arrangements are effective to exclude air or other undesirable gas in connecting procedure.

6 Claims, 10 Drawing Figures

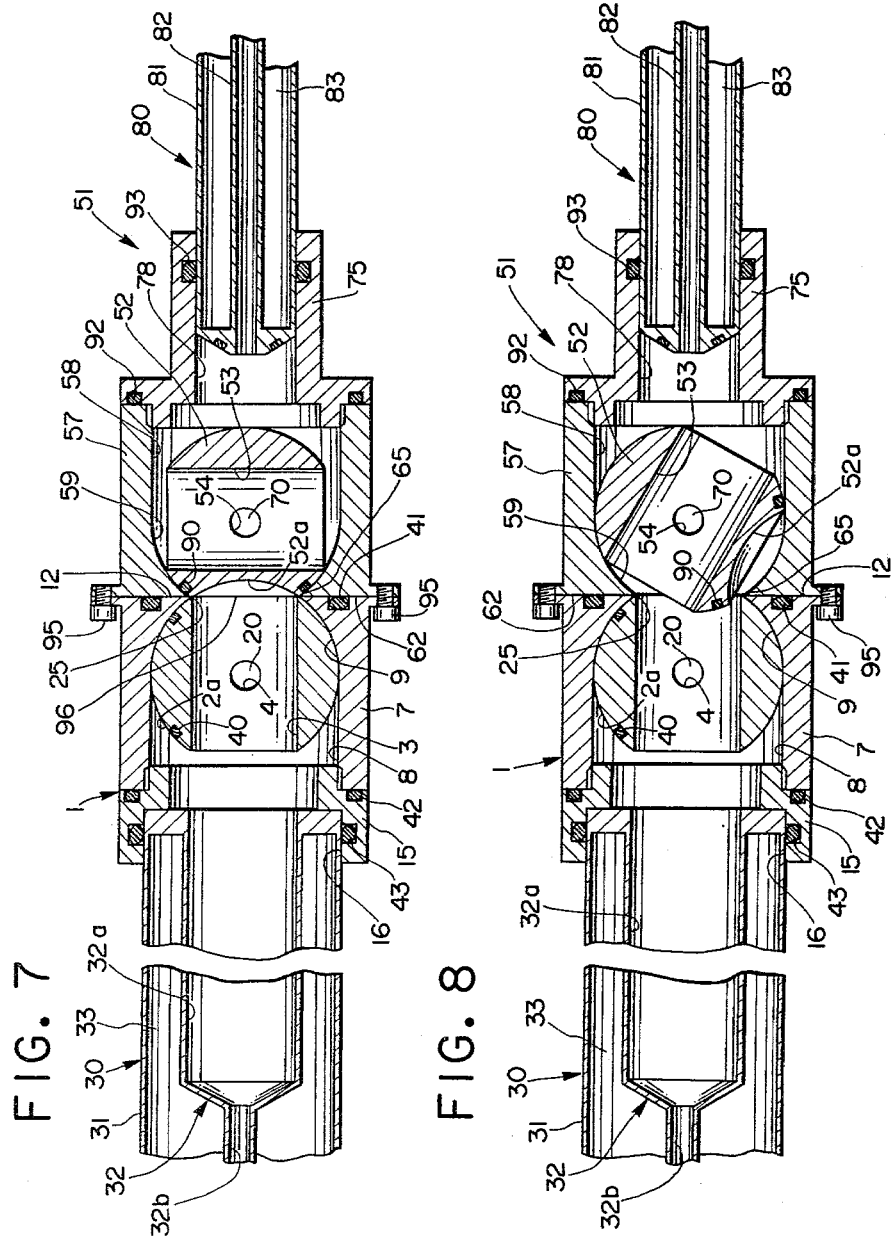

CONNECTING DEVICE FOR CONDUITS

The present invention relates to fluid-tight connectors for conduits and more particularly to such connectors comprised a female element having an axial bore opening at one of the element and a male element having an axially extending portion adapted to be inserted into the axial bore of the female element.

Conventionally, the above type of connectors have been used in conduits for supplying a special type of liquefied gas, such as liquefied helium to a facility such as a cryostat. In such applications, one of the connector elements such as the female element is connected with the facility and the other connector element such as the male element is connected with the liquefied gas source. In connecting the elements, the conduits respectively connected with the connector elements are at first filled with the gas and the end openings of the elements are temporarily plugged by thumbs of the operator or the like. Then, the axially extending portion of the male element is brought into engagement with the axial bore of the female element quickly releasing the thumbs in a flush of the gas so that air is excluded from the conduits. The connector elements are then secured together by suitable means such as bolts which are inserted through mating flanges respectively provided on the male and female elements.

In the aforementioned procedure, however, it is impossible to absolutely exclude air from the conduits. Therefore, it has been required to evacuate the conduits after the connector elements are connected to eliminate air or other undesirable gas. Only thereafter, the liquefied gas can be passed through the conduits. It will therefore be noted that a lot of gas is wasted by the evacuation procedure.

It is therefore an object of the present invention to provide a conduit connecting device in which air or other undesirable gas can be excluded during the connecting operation.

Another object of the present invention is to provide a conduit connecting device which can readily and quickly connect conduits without having any risk of air being admitted into the conduits.

According to the present invention, the above and other objects can be accomplished by a connecting device for conduits which comprises a female connecting element having an axial bore which is connected at one end with one of the conduits and opened at the other end, a male connecting element adapted to be inserted into the axial bore of the female connecting element, first ball valve means comprising first housing means adapted to be fitted at one end to the female connecting element, said first housing means having a first mating surface at the other end, a first spherical valve element provided in said first housing means and having a diametrically extending through-hole which is not less in diameter than the axial bore of the female connecting element, second ball valve means comprising second housing means adapted to be slidably fitted at one end to said male connecting element and having a second mating surface which is adapted to be brought into mating engagement with said first mating surface of the first housing means, said first and second mating surfaces respectively have openings which are aligned when the mating surfaces are engaged with each other, said openings being not less in diameter than the axial bore of the female connecting element, a second spherical valve element provided in said second housing means and having a diametrically extending through-hole which is of a diameter sufficient to pass the male connecting element therethrough, one of said first and second valve elements projecting beyond the corresponding mating surface through said opening, the other valve element having a part-spherical recess for receiving the projecting portion of said one valve element when said first and second mating surfaces are engaged with each other, first actuating means for moving the first valve element between an open position wherein the through-hole is aligned with the opening in the first mating surface and a closed position wherein the opening in the first mating surface is closed by the first valve element, second actuating means for moving the second valve element between an open position wherein the through-hole is aligned with the opening in the second mating surface and a closed position wherein the opening in the second mating surface is closed by the second valve element and the part-spherical recess is aligned with the opening in the corresponding mating surface.

According to the features of the present invention, the conduits and the connecting elements are at first filled with gas and the valve elements are then closed. Thereafter, the first and second ball valve means are connected together by bringing the first and second mating surfaces into engagement. At this instance, the projecting portion of the one valve element is received by the part-spherical recess in the other valve element. Thereafter, the one valve element is moved to the open position wherein the through-hole therein is aligned with the opening in the corresponding mating hole. Thus, it becomes possible to move the other valve element to the open position. After the other valve element has been moved to the open position, the male connecting element is slidably moved through the holes in the valve elements into the axial bore in the female connecting element. With this connecting procedure, it is possible to exclude air or other undesirable gas from the conduits.

The above and other objects and features of the present invention will become apparent from the following descriptions of a preferred embodiment taking reference to the accompanying drawings, in which:

FIGS. 7 through 10 are sectional views similar to FIG. 6 but showing sequential steps of the connecting procedure.

Figure 1:
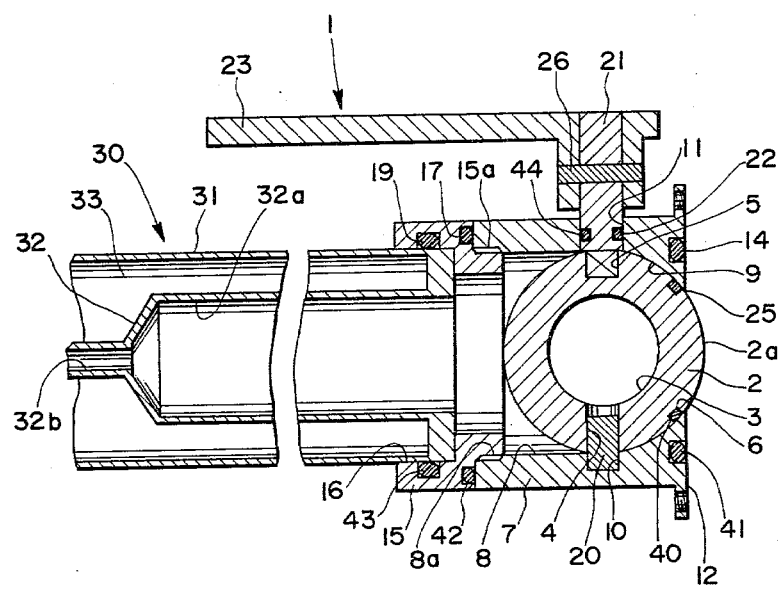
FIG. 1 is a sectional view showing a female connecting element and a first ball valve assembly in accordance with the embodiment of the present invention.
Figure 2:
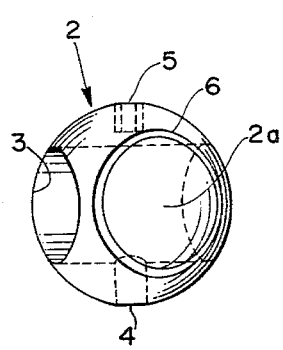
FIG. 2 is a perspective view showing the spherical valve element in the ball valve assembly shown in FIG. 1.
Figure 4:
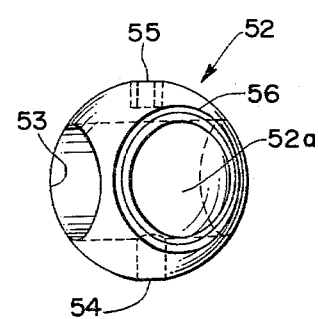
FIG. 4 is a perspective view showing the spherical valve element in the ball valve assembly shown in FIG. 3.

Referring now to the drawings, particularly to FIG. 1, there is shown a female connecting element 30 attached with a first ball valve assembly 1. The female connecting element 30 comprises an outer pipe 31 and an inner pipe 32 which are coaxially connected together with an annular space 31 therebetween. The inner pipe 32 has a large diameter portion 32a defining an axial bore and a small diameter portion 32b connected with one end of the large diameter portion 32a. The small diameter portion 32b constitutes a portion of conduit for transporting a liquefied gas such as helium. The axial bore defined by the large diameter portion 32a is opened at the other end.

The first ball valve assembly 1 includes a housing 7 which has an axial cylindrical bore 8 opening at one end of the housing 7. The cylindrical bore 8 merges at the other end into a part-spherical surface 9. The housing 7 is formed with a flat mating surface 12 at the other end and the part-spherical surface 9 merges into a circular opening 25 formed in the mating surface 12. On the housing 7, there is disposed a spherical valve element 2 which is received in the bore 8 and seated on the part-spherical surface 9. The valve member 2 is formed with a diametrically extending through-hole 3 which is of a diameter substantially equal to the diameter of the axial bore defined by the large diameter portion 32a in the female connecting element 30. The valve element 2 has a pivot pin hole 4 and a recess 5 of a polygonal cross-sectional configuration. The pivot pin hole 4 and the recess 5 are diametrically aligned.

The housing 7 is formed with diametrically aligned pivot pin hole 10 and pivot stem hole 11. A pivot pin 20 is inserted through the hole 4 into the hole 10. An actuating stem 21 is inserted through the hole 11 and engaged with the recess 5. The stem 21 is attached with an actuating handle 23 by means of a pin 26. The stem 21 is formed with an annular seal groove 22 and an O-ring 44 is disposed in the seal groove 22 for providing a gas tight seal between the stem 21 and the wall surface of the hole 11. In the mating surface 12, there is formed a circular seal groove 14 which encircles the opening 25 and an O-ring 41 is disposed in the seal groove 14.

As shown in FIG. 1, the valve element 2 project through the opening 25 in the mating surface 12 and formed with a circular seal groove 6 encircling the projecting portion 2a. An O-ring 40 is disposed in the seal groove 6 to provide a gas-tight seal between the valve element 2 and the part-spherical surface 9.

The housing 7 is mounted on the female connecting element 30 through an adapter 15. The adapter 15 is formed at one end with an external screw thread 15a which is adapted to be engaged with an internal thread 8a formed in the housing 7 at the open end of the bore 8. The adapter 15 is fitted to the outer pipe 31 of the female connecting element 30 at an end opposite to the screw thread 15a. The adapter 15 is formed with a seal groove 19 in which an O-ring 43 is disposed for providing a gas-tight seal between the adapter 15 and the female connecting element 30. The adapter 15 is further formed at an end face opposed to the housing 7 with a seal groove 17 in which an O-ring 42 is disposed for providing a gas-tight seal between the housing 7 and the adapter 15. In the position of the valve element 2 as shown in FIG. 1, the opening 25 in the mating surface 12 is closed but the valve member 2 can be rotated by the handle 23 to a position wherein the through-hole 3 is aligned with the opening 25. In this example, the opening 25 is of a diameter substantially equal to that of the hole 3.

Figure 3:
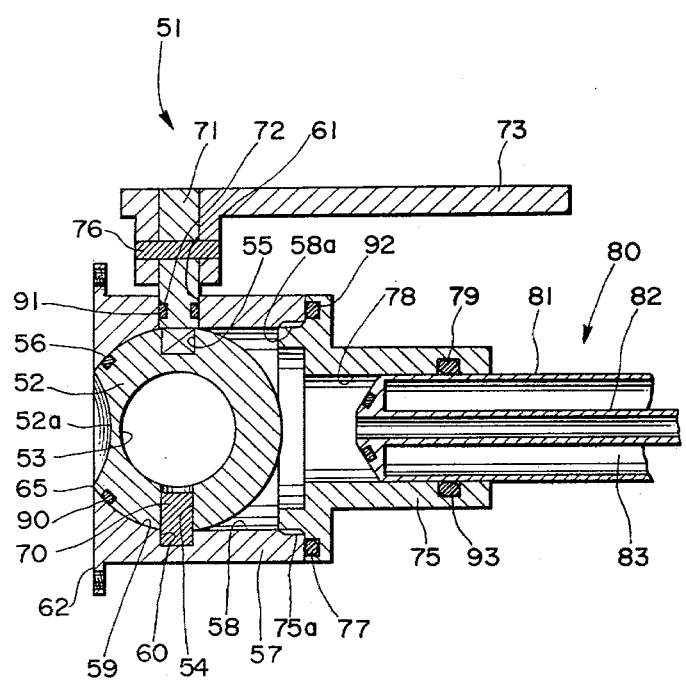
FIG. 3 is a sectional view showing a male connecting element and a second ball valve assembly.

Referring now to FIG. 3, there is shown a male connecting element 80 on which a second ball valve assembly 51 is mounted. The male connecting element 80 comprises an outer tube 81 and an inner tube 82 which are coaxially connected together with an annular space 83 therebetween. The second ball valve assembly 51 includes a housing 57 formed with an axial cylindrical bore 58 which is opened at one end of the housing 57. At the other end, the bore 58 merges into a part spherical surface 59 which in turn merges into a circular opening 65 in a flat mating surface 62 formed at the other end of the housing 57. The opening 65 is of a diameter which is substantially equal to that of the opening 25 in the mating surface 12 of the first ball valve assembly 1.

In the housing 57, there is disposed a spherical valve element 52 which is received in the bore 58 and seated on the part-spherical surface 59. The valve element 52 is formed with a diametrically extending through-hole 53. As in the first ball valve assembly 1, the valve element 52 is formed with a pivot pin hole 54 and a recess 55 of a polygonal cross-sectional configuration. The pivot pin hole 54 and the recess 55 are aligned with each other along a diametrical line substantially perpendicular to the through-hole 53 in the valve element 52. The housing 57 is formed with a pivot pin hole 60 and a stem hole 61 which are diametrically aligned with each other. A pivot pin 70 is inserted through the hole 54 into the hole 60. An actuating stem 71 is inserted through the hole 61 into the polygonal recess 55 so that the valve element 52 can be rotated by the stem 71. An actuating handle 73 is attached to the stem 71 by means of a pin 76. The stem 71 is formed with a seal groove 72 in which an O-ring 91 is disposed for providing a gas-tight seal between the stem 71 and the wall of the hole 61.

The valve element 52 is formed at the outer surface with a part-spherical recess 52a which is of a diameter substantially equal to that of the opening 65 in the mating surface 62. The recess 52a is located so that it can be aligned with the opening 65 as shown in FIG. 3. The radius of curvature of the recess 52a is equal to the outer radius of the valve element 2 in the first ball valve assembly 1 so that a part of the valve element 2 can be received in the recess 52a when the mating surface 62 is engaged with the mating surface 12. The valve element 52 is formed with a circular seal groove 56 surrounding the recess 52a and an O-ring 90 is disposed in the seal groove 56 for providing a gas-tight seal between the valve element 52 and the seating surface 59. In the position of the valve element 52 shown in FIG. 3, the opening 65 is closed by the valve element 52, however, the valve element 52 can be moved by the handle 73 to a position wherein the hole 53 is aligned with the opening 65.

The housing 57 is mounted on the male connecting element 80 through an adapter 75. The housing 57 is formed at the end opposite to the mating surface 62 with an internal screw thread 58a and the adapter 75 is formed with an external screw thread 75a for engagement with the screw thread 58a. The adapter 75 is formed with an annular seal groove 77 for receiving an O-ring 92 which provides a gas-tight seal between the housing 57 and the adapter 75. The adapter 75 further has an axial bore 78 which slidably receives the male element 80. On the wall surface of the axial bore 78, the adapter 75 is formed with a seal groove 79 which receives an O-ring 93 for providing a gas-tight seal between the adapter 75 and the male connecting element 80.

Figure 5:
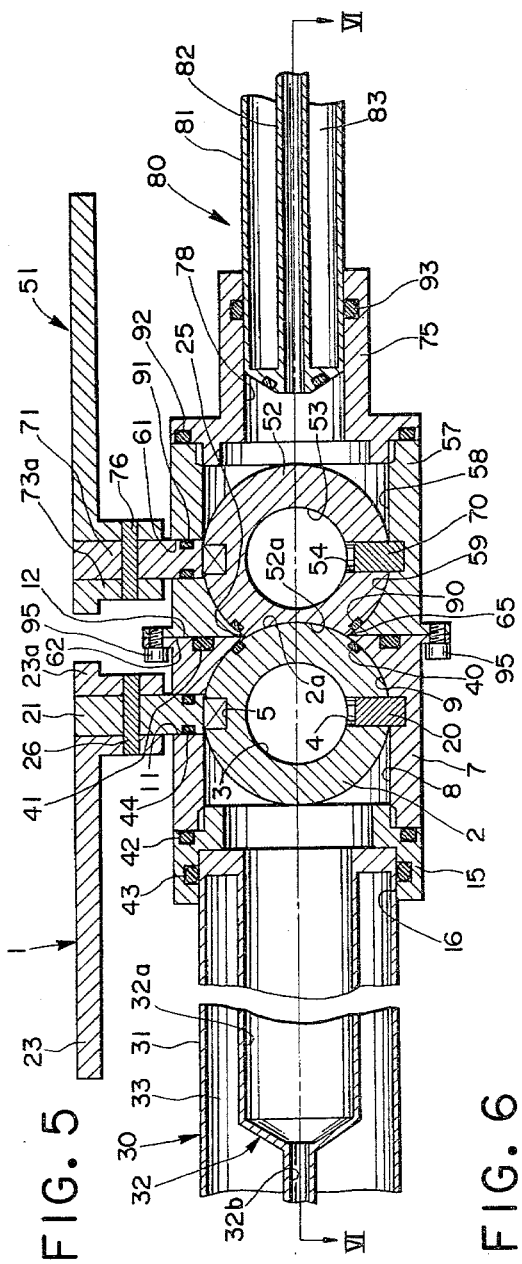
FIG. 5 is a sectional view showing the first step of connecting procedure.
Figure 6:
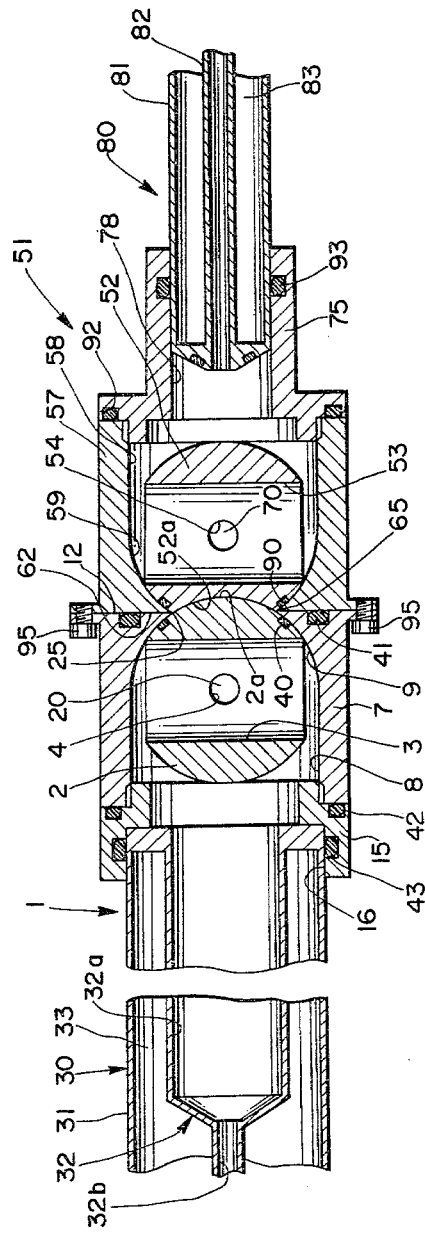
FIG. 6 is a sectional view taken substantially along the line VI—VI in FIG. 5.

Referring now to FIGS. 5 through 10 which show connecting procedure, the valve elements 2 and 52 are at first moved to the closed positions and the mating surfaces 12 and 62 on the housings 7 and 57 are engaged with each other as shown in FIGS. 5 and 6. In this position, the housings 7 and 67 are connected together by means of bolts 95. The connecting elements 30 and 80 and the ball valve assemblies 1 and 51 are in advance filled with a gas such as helium gas. Since the projecting portion 2a of the valve element 2 is received by the part-spherical recess 52a of the valve element 52, air or other undesirable gas can be completely excluded in this step.

Figure 9:
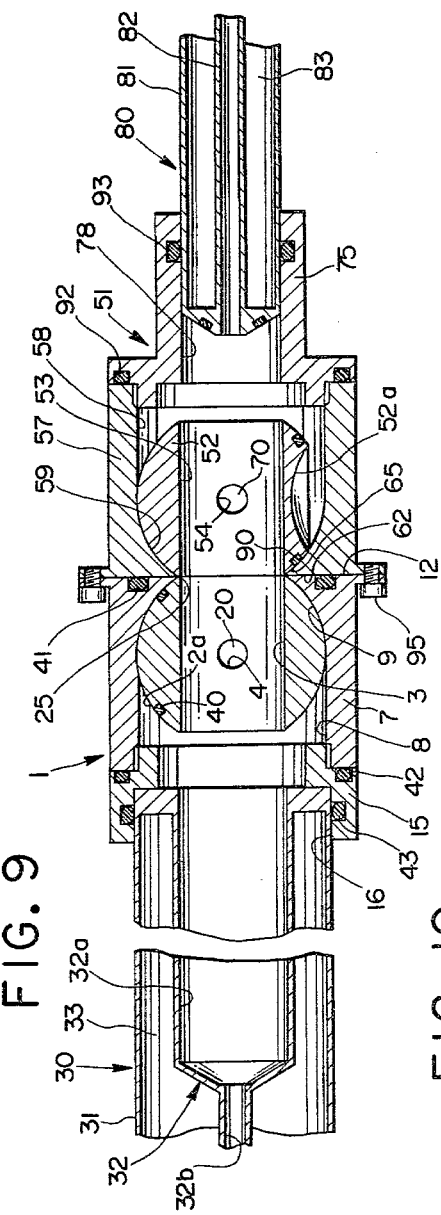
Figure 10:
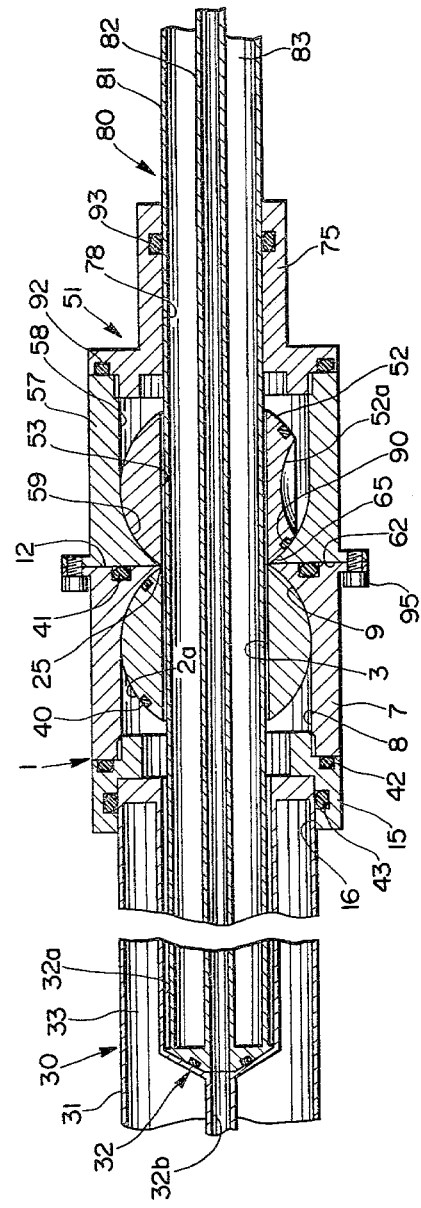

Then, the valve element 2 is rotated by the handle 23 to the open position wherein the hole 3 in the valve element 2 is aligned with the opening 25 in the mating surface 12 as shown in FIG. 7. The hole 3 in the valve element 2 is substantially equal in diameter to the opening 25 so that it becomes possible to rotate the valve element 52 by the handle 73. Thus, the handle 73 is actuated to rotate the valve element 52 as shown in FIG. 8 to the open position wherein the hole 53 in the valve element 52 is aligned with the opening 65 in the mating surface 62 as shown in FIG. 9. Thereafter, the male connecting element 80 is advance through the ball valve assemblies 1 and 51 to be inserted into the axial bore defined by the large diameter portion 32a of the female connecting element 30. It will thus be understood that with the arrangements described above connection of the conduits can be carried out without any risk of air or other undesirable gas being admitted into the conduits.

The invention has thus been shown and described with reference to a specific embodiment, however, it should be noted that the invention is in no way limited to the details of the illustrated structures but changes and modifications may be made without departing from the scope of the appended claims.

We claim:

1. A device for connecting conduits in an air-tight seal while excluding the introduction of exterior gases comprising:
    a female connecting element including an elongated, open-ended pipe defining an elongated cyindrical bore which narrows at one end to a smaller diameter pipe for communication with a conduit;
    a male connecting element including a cylindrical member with an outer diameter slightly smaller than the diameter of said elongated cylindrical bore so that said cylindrical member is slidably receivable in said cylindrical bore, said male connecting element further including an inner pipe, coaxial with said cylindrical member, for communication at one end with a conduit and at the opposite end with said smaller diameter pipe of said female connecting element;
    first ball valve means including a first housing adapted to be fitted in a sealed relationship at its one end to said female connecting element, said first housing including an interior cavity, a first mating surface at its other end, and a bore from one end to the other with a diameter sufficient to pass the male connecting element therethrough;
    a first spherical valve mounted in a sealed relationship within the cavity of said first housing, said first spherical valve having a diametrically extending through-hole with a diameter sufficient to pass the male connecting element therethrough;
    second ball valve means including a second housing with a bore from one end to the other with a diameter sufficient to slidably receive in a sealed relationship said male connecting element, said second housing further including an interior cavity and a second mating surface at one end of said bore adapted for mating engagement in a sealed relationship with said first mating surface;
    a second spherical valve mounted in a sealed relationship within the cavity of said second housing, said second spherical valve having a diametrically extending through-hole with a diameter sufficient to pass the male connecting element therethrough;
    the bores at said first and second mating surfaces defining openings which align when the mating surfaces are engaged with each other;
    one of said first and second spherical valves projecting beyond the mating surface corresponding to its respective housing, and the other spherical valve having a partial spherical recess sized to receive the projecting portion of said one spherical valve when said first and second mating surfaces are engaged with each other;
    first actuating means for moving the first spherical valve between an open position where its through-hole is aligned with the opening in the first mating surface and a closed position where the opening in the first mating surface is closed by the first spherical valve; and
    second actuating means for moving the second spherical valve between an open position where its through-hole is aligned with the opening in the second mating surface and a closed position where the opening in the second mating surface is closed by the second spherical valve and the partial spherical recess is aligned with the opening in the corresponding mating surface;
    whereby when said first and second mating surfaces are engaged in a sealed relationship and said first spherical valve and said second spherical valve are moved to the open positions, said male connecting element is slidably insertable into said female connecting element so that the inner pipe of said male connecting element is connected in a fluid-flow relationship with the smaller diameter pipe of said female connection element.

2. The device of claim 1 wherein the through-hole in said first spherical valve and the opening in the first mating surface are substantially equal in diameter to the cylindrical bore in said female element.

3. The device of claim 2 wherein the through-hole in the second spherical valve and the opening in the second mating surface are substantially equal in diameter to the cylindrical bore in said female connecting element.

4. The device of claim 1 wherein the cavity in said first housing includes a cylindrical bore having a diameter slightly larger than the diameter of said spherical valve, which bore merges at the end proximate said first mating surface to a part spherical surface sized to seat said first spherical valve.

5. The device of claim 4 wherein said spherical valve element is pivotable about an axis substantially perpendicular to the through-hole in said spherical valve element and to the axis of the cylindrical bore in said housing.

6. The device of claim 1 wherein said partial spherical recess in one of said spherical valves has a diameter substantially equal to that of the opening in the mating surface of the housing in which it is mounted, and the radius of curvature of said partial spherical recess is equal to the outer radius of curvature of the other spherical valve.

* * * * *